(12) United States Patent
Bornea et al.

(10) Patent No.: US 10,229,200 B2
(45) Date of Patent: Mar. 12, 2019

(54) LINKING DATA ELEMENTS BASED ON SIMILARITY DATA VALUES AND SEMANTIC ANNOTATIONS

(75) Inventors: Mihaela Ancuta Bornea, White Plains, NY (US); Songyun Duan, Pleseantville, NY (US); Achille Belly Fokoue-Nkoutche, White Plains, NY (US); Oktie Hassanzadeh, White Plains, NY (US); Anastasios Kementsietsidis, New York, NY (US); Kavitha Srinivas, Rye, NY (US); Michael James Ward, New Haven, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 630 days.

(21) Appl. No.: 13/491,724

(22) Filed: Jun. 8, 2012

(65) Prior Publication Data

US 2013/0332466 A1   Dec. 12, 2013

(51) Int. Cl.
G06F 17/30 (2006.01)

(52) U.S. Cl.
CPC .............. *G06F 17/30864* (2013.01)

(58) Field of Classification Search
CPC ......... G06F 17/30864; G06F 17/30755; G06F 17/30023; G06F 17/30657; G06F 17/30663; G06F 17/30672; G06F 17/30693; G06F 17/30784; G06F 17/30011; G06F 17/30867; G06F 17/30637

USPC .......................................... 707/737, 769, 802
See application file for complete search history.

(56) References Cited

U.S. PATENT DOCUMENTS

| 6,058,392 | A | * | 5/2000 | Sampson | ............ G06F 17/3033 |
| | | | | | 707/999.001 |
| 6,108,783 | A | * | 8/2000 | Krawczyk | ............. H04L 9/3236 |
| | | | | | 380/28 |
| 6,826,568 | B2 | | 11/2004 | Bernstein et al. | |
| 7,444,330 | B2 | | 10/2008 | Bernstein et al. | |

(Continued)

OTHER PUBLICATIONS

Anhai Doan, Pedrp Domingos, ALONn Y. Halevy, "Learning to Match the Schemas of Data Sources: A Multistrategy Approach", Machine Learning 50(3): 279-301 (2003).

(Continued)

*Primary Examiner* — Ashish Thomas
*Assistant Examiner* — Rezwanul Mahmood
(74) *Attorney, Agent, or Firm* — Patent Portfolio Builders PLLC

(57) ABSTRACT

Data elements from data sources and having a data value set are linked by using hash functions to determine a dimensionally reduced instance signature for each data element based on all data values associated with that data element to yield a plurality of dimensionally reduced instance signatures of equivalent fixed size such that similarities among the data values in the data value sets across all data elements is maintained among the plurality of instance signatures. Candidate pairs of data elements to link are identified using the plurality of instance signatures in locality sensitive hash functions, and a similarity index is generated for each candidate pair using a pre-determined measure of similarity. Candidate pairs of data elements having a similarity index above a given threshold are linked.

21 Claims, 2 Drawing Sheets

(56) References Cited

U.S. PATENT DOCUMENTS

| | | | | |
|---|---|---|---|---|
| 7,610,283 | B2* | 10/2009 | Arasu | G06F 17/30312 707/999.001 |
| 7,711,668 | B2 | 5/2010 | Brinker et al. | |
| 7,797,265 | B2 | 9/2010 | Brinker et al. | |
| 7,853,016 | B2* | 12/2010 | Gentry | H04L 9/3073 380/277 |
| 8,032,546 | B2* | 10/2011 | Arasu | G06F 17/30569 707/769 |
| 8,082,243 | B2 | 12/2011 | Gorelik et al. | |
| 8,166,306 | B2* | 4/2012 | Hoertnagl | H04L 9/3247 713/176 |
| 2007/0083492 | A1* | 4/2007 | Hohimer | G06N 5/02 707/999.003 |
| 2008/0162474 | A1 | 7/2008 | Thong et al. | |
| 2008/0183693 | A1* | 7/2008 | Arasu | G06F 17/30498 707/999.005 |
| 2008/0281820 | A1 | 11/2008 | Do et al. | |
| 2008/0313128 | A1* | 12/2008 | Arasu | G06F 17/30312 707/999.002 |
| 2009/0216755 | A1 | 8/2009 | Itamar | |
| 2009/0277322 | A1* | 11/2009 | Cai | G10H 1/0058 84/609 |
| 2009/0300014 | A1* | 12/2009 | Chakrabarti | G06F 17/30707 707/999.006 |
| 2010/0077217 | A1* | 3/2010 | Callaghan | G06F 21/33 713/175 |
| 2010/0131516 | A1 | 5/2010 | Jean-Mary | |
| 2010/0191734 | A1 | 7/2010 | Rajaram et al. | |
| 2010/0220853 | A1* | 9/2010 | Schneider | H04L 9/0643 380/29 |
| 2010/0306193 | A1* | 12/2010 | Pereira | G06F 17/30784 707/728 |
| 2010/0315201 | A1 | 12/2010 | Hirata et al. | |
| 2011/0038542 | A1* | 2/2011 | Barkan | G06F 11/3414 382/182 |
| 2011/0087669 | A1 | 4/2011 | Ancin et al. | |
| 2011/0131253 | A1 | 6/2011 | Peukert et al. | |
| 2011/0302155 | A1* | 12/2011 | Yan | G06F 17/30867 707/723 |
| 2012/0078913 | A1 | 3/2012 | Muni et al. | |
| 2012/0284275 | A1* | 11/2012 | Vadrevu | G06F 17/30713 707/738 |
| 2013/0159192 | A1* | 6/2013 | Partridge | G06Q 30/02 705/50 |

OTHER PUBLICATIONS

B.T. Dai, N. Koudaas, D. Srivastava, A.K.H. Tung and S. Venkatasubramanian, "Validating Multi-Column Schema Matchings by Type", In IEEE Proc. of the INt'l Conf. on Data Eng., pp. 120-129, 2008.

E. Rahm and P.A.Bernstein, "A Survey of Approaches to Automatic Schema Matching", The Int'l Journal on Very Large Databases, 10(4):334-350, 2001.

Fausto Giunchiglia et al, "S-Match: an open source framework for matching lightweight ontologies", Semantic Web—Interoperability, Usability, Applicability, IOS Press 2011.

J. Kang and J. F. Naughton, "On Schema Matching with Opaque Column Names and Data Values", In ACM SIGMOD Int'l Conf. on Mgmt. of Data, pp. 205-216, 2003.

Larson et al., "A Theory of Attribute Equivalence in Databases with Application to Schema Integration", IEEE Transactions on Software Engineering vol. 15, No. 4, Apr. 1989.

M. Zhang, M. Hadjieleftheriou, B. C. Ooi, C. M. Procopiuc, and D. Srivastava, "On Multi-Column Foreign Key Discovery", Proceedings of the VLDB Endowment (PVLDB), 3(1):805-814, 2010.

V. Satuluri et al., "Bayesian Locality Snesitive Hashing for Fast Similarity Search", Proceedings of the VLDB Endowment, vol. 5, No. 5, Aug. 27-31, 2012, Istanbul, Turkey.

* cited by examiner

LINKING DATA ELEMENTS BASED ON SIMILARITY DATA VALUES AND SEMANTIC ANNOTATIONS

FIELD OF THE INVENTION

The present invention relates to data management and data linking.

BACKGROUND OF THE INVENTION

The semantic web is an extension of the world wide web that incorporates semantics into the data or web pages that are accessed and downloaded across the internet. Discovering links between data elements of different data sources is a fundamental problem for the emerging semantic web, as well as traditional data integration systems. These links are the building blocks for searching, querying and other higher level services. Link discovery techniques span syntactic methods, many derived from similarity measures developed by Information Retrieval (IR). These techniques include structural ones, e.g., using foreign key relationships between relational database tables to establish links, semantic ones using dictionaries, taxonomies, and ontologies to determine relationships between data elements and instance based ones comparing similarity in values of model entities, e.g. values of columns in a relational database, or instances of concepts in ontologies. Many tools and frameworks have been developed that facilitate link discovery; however, even the best, most automated of these require their users to specify the subsets of the data source to attempt to link as well as the link discovery methods to use.

Therefore, users need a reasonably deep understanding of the data sources and their elements, limiting both which data sources will be linked (only those with which a user is familiar) and the number of data sources that will be linked, since these specifications take time to create. Furthermore, the ability of existing linking systems to scale to a large number of medium to large size data sources is limited due to both the quadratic number of comparisons that need to be performed to exhaustively check for links between pairs of elements of different data sources. The result is that some standard analytic techniques that assume complete access to the whole data are not applicable. To alleviate this burden, more automatic, dynamic and scalable methods for determining which data elements to link across data sources are needed.

Previous attempts to link data sources propose methods based on structural similarity, with many requiring user interaction. Very few existing methods even attempt to use instance values for matching data elements, and such instance-based methods have been described as useful but prohibitively expensive. Examples of methods that use instance value include methods that use values only for validation, methods that look at the distribution and other properties of the values to infer meta-data about the elements, methods that use only a selected sample of instance values, methods that are expensive and do not avoid the quadratic number of comparisons and methods that rely on particular properties of instance values that work only in a limited set of applications. For example, recent work proposes relying on a domain order and sorting of the values to improve efficiency, which works only in a limited number of domains and even in those domains could suffer from other shortcomings such as low accuracy, with both false positives and false negatives.

SUMMARY OF THE INVENTION

Exemplary embodiments of systems and methods in accordance with the present invention are directed to an automated method for choosing data elements from data sources to link based on similarity of semantic annotations, similarity between data value instances or a combination of both semantic annotations and data instances. Well known measures of similarity from Information Retrieval and data mining are used, e.g., Jaccard similarity and cosine similarity. Any type of annotations about semantic features of data elements can be used; however, the present invention it is not dependent on the method used to create the annotations. Unlike existing techniques that require user or human interaction to choose candidate data elements for linking, the present invention is completely automatic, because all pairs of data elements across and within all data sources are considered for linking Systems and methods in accordance with the present invention are computationally feasible in both space and time through the significant reduction in search space achieved through the use of signatures. For each data element, a summary of the set of data values or annotations for that element is computed. This summary is called a signature. These signatures are constructed in a manner that preserves similarity, i.e., the similarity of two signatures is very close to the similarity of their underlying sets. In addition, these signatures have a fixed size regardless of the size of the sets of annotations and data values.

Locality Sensitive Hashing (LSH) techniques are used to reduce the number of candidate pairs that need to be considered for similarity comparison, avoiding the quadratic cost associated with an exhaustive comparison of all candidate pairs. These LSH functions assign or arrange signatures with a higher likelihood of being similar to the same categories or buckets than those with a lower likelihood. As a result, only a small fraction of signatures, only those that end up in the same bucket, need to be exhaustively compared. In addition to the use of data value instances, semantic annotations are used as an alternative to or in combination with the data value instances to construct signatures that preserve semantic similarity.

In accordance with one exemplary embodiment of a method for linking data elements across and within a plurality of data sources, the plurality of data sources having data elements are to be linked are identified. Instance data, i.e., the data values for the data value sets for each one of a plurality of data elements are retrieved from the data sources. These data elements and data value sets are based on the structure of the data source, e.g. a relational data source, an extensible mark-up language (XML) document or a spreadsheet. The retrieved instance data are associated with the appropriate data elements.

Signatures are constructed to provide dimensionally reduced representations of the value sets of the data elements that account for all data values in the data value set, have a uniform fixed size and maintain similarities among the underlying data values. In one embodiment, a comprehensive or universal data value set or annotations terms is created. These data values may be tokenized in a variety of ways recognized in Information Retrieval practice. For each data element in the universal data value set, the occurrence frequency of each data value is calculated. This occurrence frequency may represent the presence or absence of the term, the count of the number of times the term appears or a weighted value term, e.g., term frequency-inverse document frequency. Based on the occurrence frequency, a similarity weight, i.e., a weight to be given to any data value during a determination of similarity, is assigned to each data value such that the similarity weight is inversely proportional to occurrence frequency.

A set of similarity preserving data instance hash functions are identified and are used to produce a signature for each data element. The size of the signature depends on the number of hash functions used to create the signature rather than the total number of terms as each data value hash functions accounts for a single signature hash value in the instance signature. This significantly reduces storage size. In addition, data value semantic annotations are retrieved or calculated for each data element. These semantic annotations are used to construct semantic signatures. The instance signatures, semantic signatures or a combination of the instance and semantic signatures are used to produce pairs of data elements that are candidates for linkage. To increase the accuracy of the candidate predictions, multiple signatures can be used. Pairs of data elements that share some number of signature elements (or have a number of similar signatures) become candidates. The similarity of each candidate pair is computed using a desired, user-defined measure of similarity, i.e., similarity function. Pairs of data elements whose similarity measure exceeds a user defined threshold are then linked.

In accordance with one exemplary embodiment, the present invention is directed to a system for linking data elements derived from data sources that includes a data element linking computing system in communication with a plurality of data sources. Each data source contains a plurality of data elements, and each data element has an associated context within its data source and a data value set containing a plurality of data values for that data element. The data element linking computing system includes a database to store the data elements and an instance signature module in communication with the database that is configured to determine a dimensionally reduced instance signature for each data element based on all data values associated with that data element to yield a plurality of dimensionally reduced instance signatures of equivalent fixed size such that similarities among the data values in the data value sets across all data elements is maintained among the plurality of instance signatures. A data element pairing module is provided in communication with the instance signature module and the database to identify candidate pairs of data elements to link using the plurality of instance signatures. A similarity determination module in communication with the data element pairing module and the database generates a similarity index for each candidate pair using a pre-determined measure of similarity, and a data element linking module in communication with the similarity determination module links candidate pairs of data elements having a similarity index above a given threshold.

In one embodiment, each data source is a data collection having at least one of structured data and semi-structured data. In one embodiment, the instance signature module also includes a plurality of data value hash functions used to generate the dimensionally reduced data instance signature for each data element. The data value hash functions can be selected to be compatible with the pre-determined measure of similarity used by the similarity determination module to generate the similarity index. In one embodiment, the database includes the plurality of dimensionally reduced instance signatures. Each dimensionally reduced instance signature is a hash value set having a quantity of hash values equal to the fixed size. The instance signature module utilizes a number of data value hash functions equal to the quantity of hash values. In one embodiment, each instance signature is a set of signature hash values containing a plurality signature hash values equal in number to the plurality of data value hash functions. In one embodiment, the database includes a universal data value set that includes all data values from all data value sets. An occurrence frequency module determines a frequency of occurrence for each data value within the universal data value set and assigns a similarity weight to each data value based on the occurrence frequency associated with the data value such that the similarity weight is inversely proportional to the occurrence frequency.

In one embodiment, the database contains semantic annotations associated with data values in each data set, and the system further includes a semantic signature module in communication with the database and the data element pairing module to construct a semantic signature for each data set to yield a plurality of semantic signatures. The data element pairing module uses the plurality of instance signatures in combination with the plurality of semantic signatures to identify the candidate pairs. In one embodiment, the database includes a semantic annotation determination module to assign semantic annotations to the data values in each data value set. The candidate pairs are a subset of all pairs of data elements. In one embodiment, the data element pairing module further includes a signature hashing module containing at least one signature hash function configured to map each signature into one or more of a plurality of categories to generate a categorical signature for each instance signature associated with each data element and to compare categorical signatures to identify pairs of instance signatures mapping to common categories. The identified candidate pairs of data elements are associated with the identified pairs of instance signatures. In one embodiment, the signature hash function is a locality sensitive hash function. The pre-determined measure of similarity can be jaccard similarity, cosine similarity or combinations thereof.

In one exemplary embodiment, the present invention is directed to a system for linking data elements derived from data sources that includes a data element linking computing system in communication with a plurality of data sources. Each data source includes a plurality of data elements, and each data element has an associated context within its data source and a data value set containing a plurality of data values for that data element. The data element linking computing system includes a database to store the data elements. The database includes semantic annotations associated with data values in each data set. A semantic signature module is provided in communication with the database to construct a semantic signature for each data set to yield a plurality of semantic signatures. A data element pairing module in communication with the semantic signature module and the database to identify candidate pairs of data elements to link using the plurality of semantic signatures. A similarity determination module is in communication with the data element pairing module and the database to generate a similarity index for each candidate pair using a pre-determined measure of similarity, and a data element linking module is in communication with the similarity determination module to link candidate pairs of data elements having a similarity index above a given threshold. In one embodiment, the database further also includes a semantic annotation determination module to assign semantic annotations to the data values in each data value set.

In one embodiment, the database includes a universal data value set containing all data values from all data value sets and an occurrence frequency module to determine a frequency of occurrence for each data value within the universal data value set and to assign a similarity weight to each data value based on the occurrence frequency associated with the data value such that the similarity weight is inversely proportional to the occurrence frequency. The candidate pairs are a subset of all pairs of data elements. In one embodiment, the data element pairing module includes a signature hashing module containing at least one signature hash function configured to map each signature into one or more of a plurality of categories to generate a categorical signature for each semantic signature associated with each data element and to compare categorical signatures to identify pairs of semantic signatures mapping to common categories. The identified candidate pairs of data elements are associated with the identified pairs of semantic signatures. In one embodiment, the signature hash function is a locality sensitive hash function. Suitable pre-determined measures of similarity are jaccard similarity, cosine similarity or combinations thereof.

In accordance with one exemplary embodiment, the present invention is also directed to a method for linking data elements of data sources. A plurality of data elements is identified. Each data element is derived from a data source and has an associated context within the data source. A data value set is obtained containing a plurality of data values for each data element. A dimensionally reduced instance signature is determined for each data element based on all data values associated with that data element to yield a plurality of dimensionally reduced instance signatures of equivalent fixed size such that similarities among the data values in the data value sets across all data elements is maintained among the plurality of instance signatures. The plurality of instance signatures is used to identify candidate pairs of data elements to link, and a similarity index is generated for each candidate pair using a pre-determined measure of similarity. The candidate pairs of data elements having a similarity index above a given threshold are linked. Each data source is a data collection containing at least one of structured data and semi-structured data.

In one embodiment, in order to determine the dimensionally reduced instance signature, a plurality of data value hash functions are identified and are used to generate the dimensionally reduced instance signature for each data element. These data value hash functions can be selected based on the pre-determined measure of similarity used to generate the similarity index. In one embodiment, each dimensionally reduced instance signature includes a hash value set having a quantity of hash values equal to the fixed size. A number of data value hash functions equal to the quantity of hash values are identified. Each data value in a given data value set is processed through each data value hash function to generate for that data value set a plurality of potential hash values for each data value hash function. A signature hash value is selected for each data value hash function from its plurality of potential hash values, and the selected hash values are assembled into a set of signature hash values. The set of signature hash values is the instance signature for that data value set. In one embodiment, selecting the signature hash value includes selecting a minimum, maximum, average or median potential hash value.

In one embodiment, a universal data value set containing all data values from all data value sets is constructed. An occurrence frequency is calculated for each data value within the universal data value set, and a similarity weight is assigned to each data value based on the occurrence frequency associated with the data value. The similarity weight is inversely proportional to the occurrence frequency. The similarity weight is used throughout the method for linking data elements. For example, hash functions are identified that utilize the similarity weights associated with the data values. In addition, data values are removed from each data set that have associated similarity weights below a prescribed level before processing the data values through the data value hash functions. In one embodiment, the signature hash values are selected based on the similarity weights associated with the data values.

In one embodiment, semantic annotations associated with data values in each data set are used to construct a semantic signature for each data set to yield a plurality of semantic signatures. The plurality of instance signatures is used in combination with the plurality of semantic signatures to identify the candidate pairs. If necessary, semantic annotations are assigned to the data values in each data value set. In one embodiment, at least one signature hash function is identified that is configured to map each signature into one or more of a plurality of categories. A categorical signature is generated for each instance signature associated with each data element, and the categorical signatures are compared to identify pairs of instance signatures mapping to common categories. Candidate pairs of data elements associated with the identified pairs of instance signatures are identified. In one embodiment, each signature hash function is identified empirically to achieve a desired reduction in the number of candidate pairs of data elements and an associated increase in data element linking performance. Suitable hash functions are locality sensitive hash functions. The pre-determined measure of similarity can be jaccard similarity, cosine similarity or combinations thereof.

In accordance with one exemplary embodiment, the present invention is directed to a method for linking data elements in data sources. A plurality of data elements is identified. Each data element is derived from a data source and has an associated context within the data source. A data value set containing a plurality of data values is obtained for each data element. The semantic annotations associated with data values are used in each data set to construct a dimensionally reduced semantic signature for each data set to yield a plurality of semantic signatures. The plurality of semantic signatures is used to identify candidate pairs of data elements to link, and a similarity index is generated for each candidate pair using a pre-determined measure of similarity. Candidate pairs of data elements having a similarity index above a given threshold are linked. In one embodiment, semantic annotations are assigned to the data values in each data value set.

DETAILED DESCRIPTION

Figure 1:
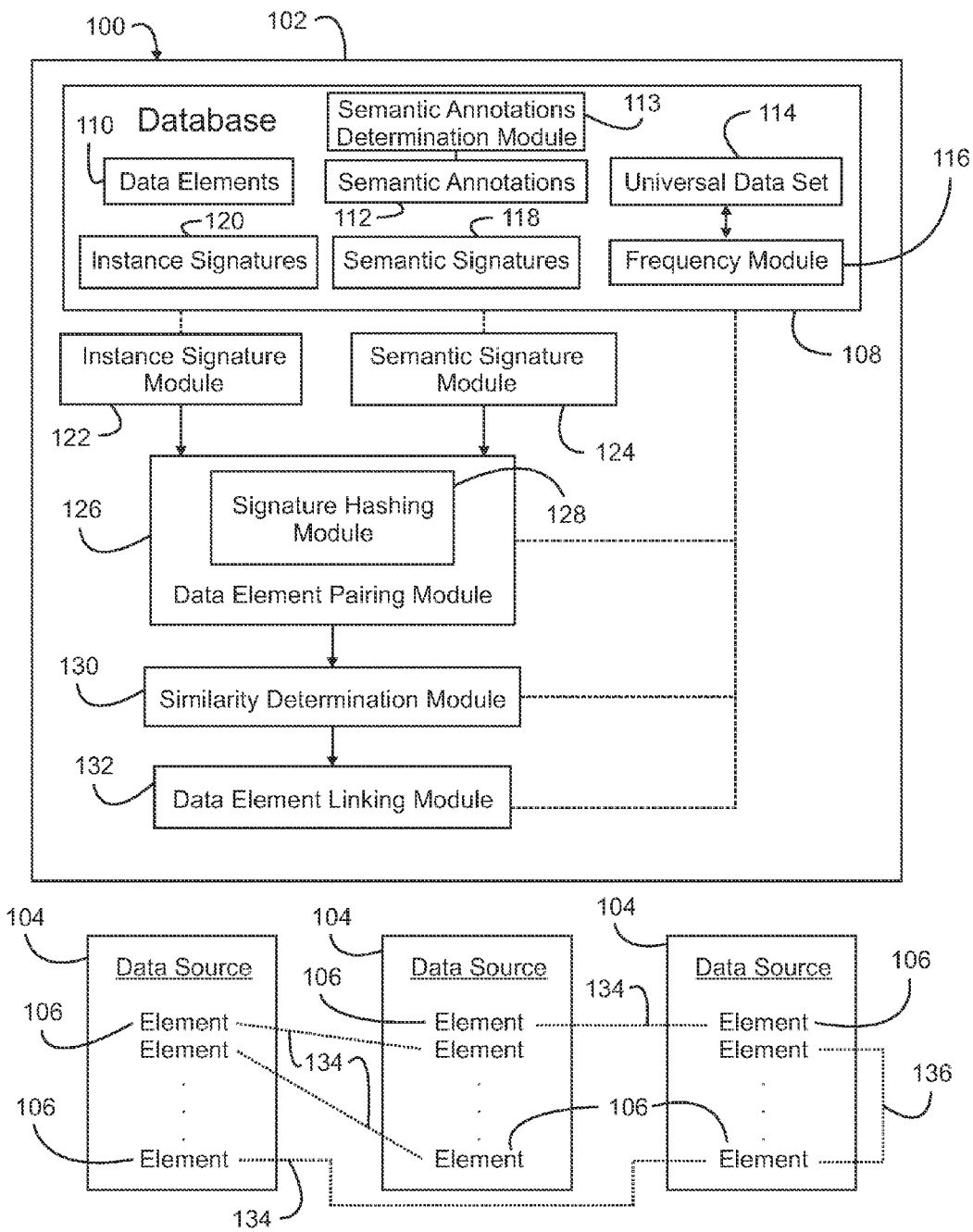
FIG. 1 is a an illustration of an embodiment of a system for linking data elements of data sources in accordance with the present invention.

Referring initially to FIG. 1, an exemplary embodiment of a system for linking data elements derived from data sources 100 is illustrated. The system includes a data element linking computing system 102 that is in communication with at least one and preferably a plurality of data sources 104. Suitable computing systems include computers and processors within a single domain as well as distributed computing systems. These systems include the processors and software applications required to perform the functions of the data element linking computing system. Suitable data sources include collections or repositories of data, preferably in a computer or machine readable format. These data include structured data such as a relational database and semi-structured data such as an extensible mark-up language (XML) document. Each data source comprises at least one and preferably a plurality of data elements 106. A given data element represents a subset of the data contained in its data source. This subset of data has a unifying or common associated context within the data source. For example the subset of data is a given grouping of data or a column of data in a database. In addition, each data element has an associated data value set that includes a plurality of data values, i.e., data instances, for that data element. When the data element is a table column, the set of data values are all the entries in the table rows at that column.

The data element linking computing system includes at least one database that can store the required data including the data elements 110, instance signatures 120, semantic annotations 112 of the data elements, semantic signatures 118, a universal data set 114 of data values and a frequency module 116. The data base can also store the programs or program code embodying the functionality of the system for linking data elements from data sources. An instance signature module 122 is included in communication with the database 108. The instance signature module produces dimensionally reduced instance signatures for each data element based on all data values associated with that data element. This yields a plurality of dimensionally reduced instance signatures, one or more for each data element. Each instance signature is of an equivalent fixed size regardless of the size of the data value set associated with each data element. In addition, similarities among the data values in the data value sets across all data elements are maintained among the plurality of instance signatures. Therefore, if two data elements are similar, then the instance signatures for these data elements are also similar.

In one embodiment, the instance signature module includes a plurality of data value hash functions that are used to generate the dimensionally reduced data instance signature for each data element. These data value hash functions can be assembled or selected based upon the desired similarity measured that will be used to calculate a similarity index for pairs of data elements. Therefore, the data value hash functions are compatible with the pre-determined measure of similarity used by the similarity determination module to generate the similarity index. The dimensionally reduced instance signatures 120 are stored in the database. Each dimensionally reduced instance signature is a hash value set having a quantity of hash values equal to the fixed size, which is equal to the number of hash functions as each hash function yields one hash value. The instance signature module utilizes a number of data value hash functions equal to the quantity of hash values. In one embodiment, each instance signature is a set of signature hash values containing a plurality of signature hash values equal in number to the plurality of data value hash functions.

A data element pairing module 126 is provided in communication with the instance signature module 122 and the database 108. This module identifies, using the plurality of instance signatures, candidate pairs of data elements to link. These candidate pairs are a subset of all potential pairings of data elements from the data sources. The data element linking computing system includes a similarity determination module 130 that is in communication with the data element pairing module and the database. The similarity determination module generates a similarity index for each candidate pair using a pre-determined measure of similarity. These pre-determined measures of similarity include, but are not limited to Jaccard similarity and cosine similarity.

A data linking module 132 is provided in communication with the similarity determination module to link candidate pairs of data elements having a similarity index above a given threshold as determined by one or more of the pre-determined measures of similarity. These links include inter-data source links 134 and intra-data source links 136. Information regarding these links can also be stored in the database. The universal data value set 114 in the database includes all data values from all data value sets. This universal data value set is in communication with the occurrence frequency module 116. This frequency module determines the frequency of occurrence for each data value within the universal data value set. Based on the frequency of occurrence, the frequency module assigns a similarity weight to each data value such that the similarity weight is inversely proportional to the occurrence frequency. Therefore, data values appearing more often in the data elements, i.e., that have a higher frequency of occurrence are assigned a lower similarity weight and vice versa. This is the weight that a given data value has in discerning similarity. If a data value appears more often, i.e., has a greater occurrence frequency, that data value is less discerning as it is more likely to appear in all data elements. This does not offer much in the way of a distinction that can be used to link data elements. Data values with a low relative frequency appear in only a few data elements, offer a stronger indication of a unique similarity among those data elements.

In one embodiment, the database includes semantic annotations 112 associated with data values in each data set. These semantic annotations can be generated or obtained from any source. This includes being generated by the system, although system generation is not required. In one embodiment, the database further includes a semantic annotation determination module 113 to assign semantic annotations to the data values in each data value set. A semantic signature module 124 in communication with the database and the data element pairing module constructs a semantic signature for each data value set using the semantic annotations associated with the data values in the data value set. This yields a plurality of semantic signatures 118, which are stored in the database. Therefore, the system has both instance signatures and semantic signatures available for making data element linking similarity determinations. The data element pairing module uses the plurality of instance signatures, the plurality of semantic signatures or a combination of the instance signatures and the semantic signatures to identify the candidate pairs, which are a subset of all possible data element pairs The data element pairing module 126 includes a signature hashing module containing at least one signature hash function configured to map each signature into one or more of a plurality of categories or buckets. This generates a categorical signature for each instance signature associated with each data element. These categorical signatures are compared to identify pairs of instance signatures mapping to common categories. The identified candidate pairs of data elements are associated with the identified pairs of instance signatures. Suitable signature hash functions include, but are not limited to a locality sensitive hash function.

Figure 2:
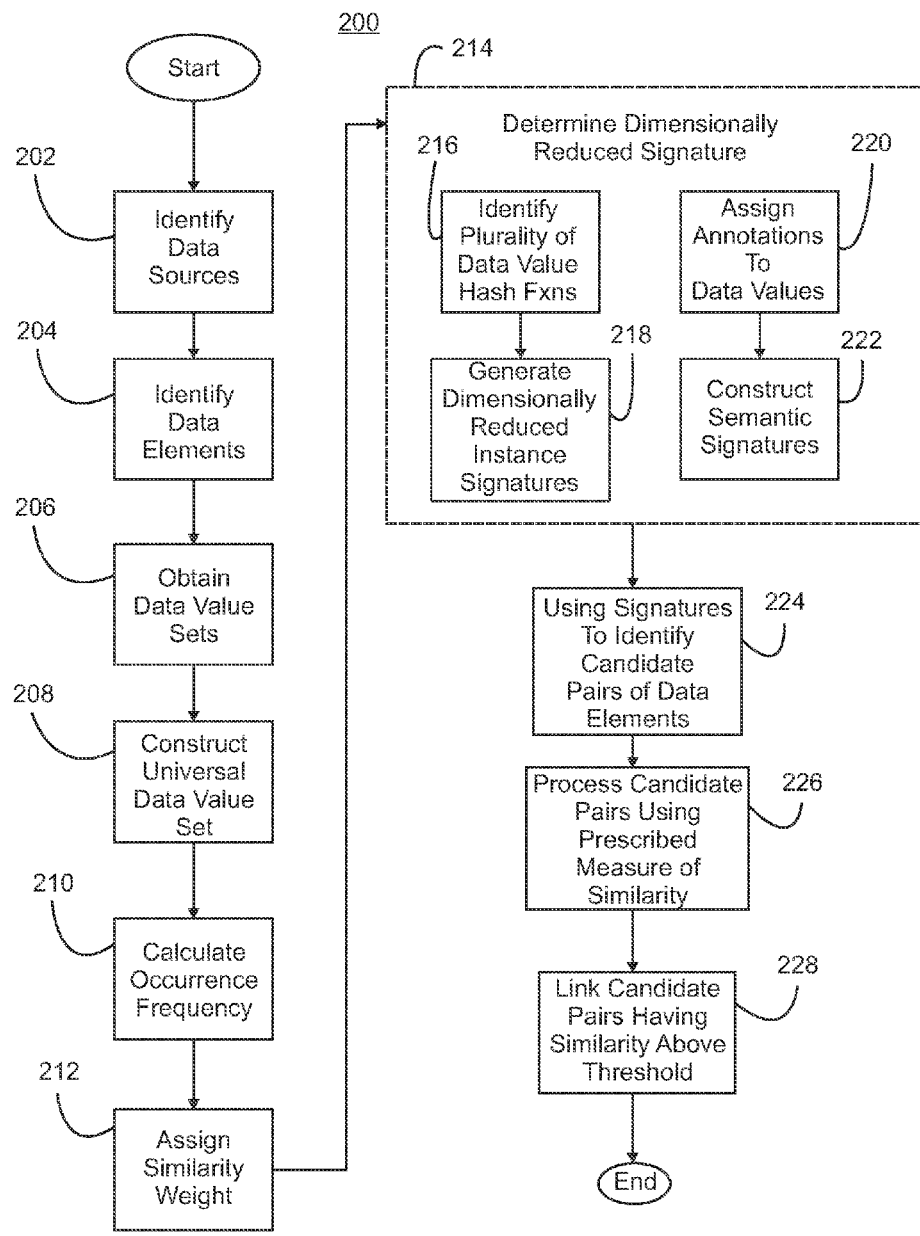
FIG. 2 is a flow chart illustrating an embodiment of a method for linking data elements of data sources in accordance with the present invention.

Referring to FIG. 2, in accordance with one exemplary embodiment, the present invention is directed to a method for linking data elements of data sources 200, this includes linking data elements within a given data source and across distinct data sources. A plurality of data sources is identified 202. Any suitable collection or repository of data can be identified as a data source including data sources located in a single domain or distributed across multiple domains. The data sources can include structured and semi-structured data. A plurality of data elements are also identified 204. Each data element is derived from a data source and is a subset of the data source having an associative context within that data source, e.g., a column within a relational database. A given data element contains a plurality of data instances, i.e., data values; therefore, a data value set containing that plurality of data values is obtained for each data element 206. This information is stored, for example, in the database.

The data elements will be linked in pairs, and therefore, candidate pairs of data elements will be compared. Such a comparison involves comparing the data value sets of the candidate pairs. As the number of candidate pairs and the size of the data value sets grow, these comparisons consume increasing amounts of time and processing resources. Therefore, the number candidate pairs and the number of data value comparisons are reduced. Initially, the data value sets will be dimensionally reduced, i.e., reduced in size. A universal data value set is constructed 208 that includes all data values from all data value sets associated with all identified data elements, and an occurrence frequency for each data value within the universal data value set is calculated 210. Any known method for calculating the frequency of occurrence of a given data element within a data set can be used. A similarity weight is then assigned to each data value based on the occurrence frequency associated with the data value 212. This similarity weight is inversely proportional to the occurrence frequency as more frequently occurring data values do not discriminate among data elements as well as less frequently occurring data values. The similarity weighed is used at various points in the process of linking data elements. This includes identifying functions that dimensionally reduce the size of a data set, such as hash functions based on the use of the similarity weights in those functions. The similarity weight is also used to remove data values from a given data value set having a similarity weight below a prescribed threshold before processing that data value set through any dimensionally reducing function. Similarity weights are also used in the selection of the signatures associated with data value sets.

One or more dimensionally reduced signatures, including both instance signatures and semantic signatures, are then determined for each data element 214. This determination is made based on all data values associated with that data element to yield a plurality of dimensionally reduced signatures, at least one for each data element, of equivalent fixed size such that similarities among the data values in the data value sets across all data elements is maintained among the plurality of signatures. Therefore, all data values are considered and similarity is maintained even though the dimensionality is decreased. In order to create the instance signatures, i.e., signatures for data value sets based on the instance data or data values contained within those sets, a plurality of data value hash functions are identified 216. These data value hash functions can be selected, for example, based on the pre-determined measure of similarity that is ultimately used to determine the similarity between pairs of data elements and to generate the similarity index. In one embodiment, the number of data value hash functions is chosen to equal the desired dimensionality or predetermined fixed size of the instance signatures as each hash function will yield one signature hash value within a given signature.

The plurality of data value hash functions are used to generate the dimensionally reduced instance signature for each data element 218. Each dimensionally reduced instance signature is a hash value set having a quantity of hash values equal to the fixed size of the instance signature. Therefore, the number of data value hash functions identified equals this quantity of hash values. This equality is used in the processing of data values through the hash functions to generate the instance signatures of the desired size. In one embodiment, each data value in a given data value set is processed through each data value hash function to generate for that data value set a plurality of potential hash values for each data value hash function. The number of potential hash values for each data value hash function equals the number of data values. This number, however, is reduced to one. To accomplish this reduction, a single signature hash value is selected, identified or constructed for each data value hash function from its plurality of potential hash values. The selected hash values are then assembled into a set of signature hash values. These sets of signature hash values are the instance signatures for the data value sets and thus for the data elements. Suitable methods for selecting the signature hash value further include, but are not limited to, selecting a minimum, maximum, average or median potential hash value.

In order to determine a semantic signature for each data element, data value annotations are used. Any suitable type of annotations can be used, and these annotations can be pre-existing. If such annotations do not exist, semantic annotations are assigned to the data values in each data value set 220. The existing or assigned semantic annotations associated with data values in each data set are used to construct a semantic signature for each data set 22. This yields a plurality of semantic signatures. The instance signatures and semantic signatures can be used alone or in combination, for example, to identify the candidate pairs of data elements to link.

The plurality of signatures including instance signatures or semantic signatures or a combination of signatures is used to identify candidate pairs of data elements to link 224. This represents identifying a subset of all pairs of data elements. Therefore, the number of pairs of elements that need to be analyzed or considered is reduced by removing pairs that are highly unlikely to be similar. In one embodiment, hash functions are also applied when using the plurality of instance signatures to identify candidate pairs. Therefore, at least one signature hash function is identified to map each signature into one or more of a plurality of categories or buckets. The signature hash functions are separate from the data value hash function. These signature hash functions are chosen, preferably empirically, based on a desired increase in one or more data element linking performance metrics, e.g., speed of analysis, processing power consumption and number of comparisons performed. In one embodiment, each signature hash function is selected empirically to achieve a desired reduction in the number of candidate pairs of data elements and an associated increase in data element linking performance. Suitable signature hash functions include, but are not limited to, locality sensitive hash functions. These hash functions provide a probabilistic dimension reduction and map similar items or signature hash values to common categories or buckets.

A categorical signature is created for each instance signature associated with each data element. These categorical signatures are compared to identify pairs of instance signatures mapping to common categories. The candidate pairs of data elements are the data elements associated with the identified pairs of instance signatures. The candidate pairs of data elements are processed using one or more pre-determined measures of similarity 226, and a similarity index is generated for each candidate pair using the pre-determined measures of similarity. The similarity indexes can be generated by processing the instance and semantic signatures, the data value sets or modified data value sets. Suitable measures of similarity include, but are not limited to Jaccard similarity and cosine similarity. A desired threshold for similarity is determined, and candidate pairs of data elements having a similarity index above that given threshold are linked 228.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for linking data elements across data sources in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for automatically linking data elements of data sources, the method comprising:
    identifying a plurality of data elements, each data element derived from a given data source and comprising a subset of data from the given data source, the subset of data comprising an unifying context within the given data source, each data source comprising a database accessible by a computing system and containing data in machine readable format;
    obtaining a data value set comprising a plurality of data values for the subset of data in each data element;
    determining a dimensionally reduced instance signature for each data element based on all data values associated with that data element to yield a plurality of dimensionally reduced instance signatures each comprising an equivalent fixed number of hash values, by:
        identifying a plurality of data value hash functions equal to the fixed number of hash values; and
        using the plurality of data value hash functions to generate the dimensionally reduced instance signature for each data element by processing all data values in each data value set through each one of the plurality of data value hash functions to generate one of the hash values such that similarities among the data values in the data value sets across all data elements is maintained among the plurality of instance signatures such that each hash value comprises input from all data values in each data element;
    using the plurality of instance signatures to identify candidate pairs of data elements to link by using a signature hash function separate from the plurality of data value hash functions to map each dimensionally reduced data signature into one category in a plurality of categories and only identifying candidate pairs of data elements to link having dimensionally reduced data signatures mapped to a common category;
    generating a similarity index for each candidate pair using dimensionally reduced instance signatures for each candidate pair and a pre-determined measure of similarity; and
    linking candidate pairs of data elements having a similarity index above a given threshold.

2. The method of claim 1, wherein each data source comprises a data collection comprising at least one of structured data and semi-structured data.

3. The method of claim 1, wherein the step of identifying the plurality of data value hash functions further comprises selecting the data value hash functions based on the pre-determined measure of similarity used to generate the similarity index.

4. The method of claim 1, wherein the step of using the plurality of data value hash functions further comprises:
    processing each data value in a given data value set through each data value hash function to generate for that data value set a plurality of potential hash values for each data value hash function;

selecting a signature hash value for each data value hash function from its plurality of potential hash values; and assembling the selected hash values into a set of signature hash values, the set of signature hash values comprising the instance signature for that data value set.

5. The method of 4, wherein the step of selecting the signature hash value further comprises selecting a minimum, maximum, average or median potential hash value.

6. The method of claim 1, wherein:

the method further comprises:

constructing a universal data value set comprising all data values from all data value sets;

calculating an occurrence frequency for each data value within the universal data value set; and assigning a similarity weight to each data value based on the occurrence frequency associated with the data value, the similarity weight inversely proportional to the occurrence frequency; and the step of identifying the plurality of data value hash functions further comprises identifying hash functions that utilize the similarity weights associated with the data values.

7. The method of claim 4, wherein the method further comprises:

constructing a universal data value set comprising all data values from all data value sets;

calculating an occurrence frequency for each data value within the universal data value set;

assigning a similarity weight to each data value based on the occurrence frequency associated with the data value, the similarity weight inversely proportional to the occurrence frequency; and removing data values from each data set having associated similarity weights below a prescribed level before processing the data values through the data value hash functions.

8. The method of claim 4, wherein:

the method further comprises:

constructing a universal data value set comprising all data values from all data value sets;

calculating an occurrence frequency for each data value within the universal data value set; and assigning a similarity weight to each data value based on the occurrence frequency associated with the data value, the similarity weight inversely proportional to the occurrence frequency; and the step of selecting the signature hash value further comprises selecting the signature hash values based on the similarity weights associated with the data values.

9. The method of claim 1, wherein the step of determining a dimensionally reduced signature for each data element further comprises:

using semantic annotations associated with data values in each data set to construct a semantic signature for each data set to yield a plurality of semantic signatures; and the step of using the plurality of instance signatures to identify candidate pairs of data elements to link further comprises using the plurality of instance signatures in combination with the plurality of semantic signatures to identify the candidate pairs.

10. The method of claim 9, wherein the method further comprises assigning semantic annotations to the data values in each data value set.

11. The method of claim 1, wherein the step of using the plurality of instance signatures to identify candidate pairs further comprises identifying a subset of all pairs of data elements.

12. The method of claim 1, wherein the step of using the plurality of instance signatures to identify candidate pairs further comprises:

identifying the signature hash function configured to map each signature into one or more of a plurality of categories;

generating a categorical signature for each instance signature associated with each data element;

comparing categorical signatures to identify pairs of instance signatures mapping to common categories; and identifying candidate pairs of data elements associated with the identified pairs of instance signatures.

13. The method of claim 12, wherein the step of identifying at least one signature hash function further comprises identifying each signature hash function empirically to achieve a desired reduction in the number of candidate pairs of data elements and an associated increase in data element linking performance.

14. The method of claim 12, wherein the signature hash function comprises a locality sensitive hash function.

15. The method of claim 1, wherein the pre-determined measure of similarity comprises jaccard similarity, cosine similarity or combinations thereof.

16. A method for automatically linking data elements in data sources, the method comprising:

identifying a plurality of data elements, each data element derived from a given data source and comprising a subset of data from the given data source, the subset of data comprising an unifying context within the given data source, each data source comprising a database accessible by a computing system and containing data in machine readable format;

obtaining a data value set comprising a plurality of data values for each data element;

using semantic annotations associated with data values in each data set to construct a semantic signature for each data set to yield a plurality of semantic signatures, each semantic signature preserving all semantic similarity in a given data set;

using the plurality of semantic signatures to identify candidate pairs of data elements to link by using a signature hash function separately to map each semantic signature into one category in a plurality of categories and only identifying candidate pairs of data elements to link having semantic signatures mapped to a common category;

generating a similarity index for each candidate pair using semantic signatures for each candidate pair and a pre-determined measure of similarity; and linking candidate pairs of data elements having a similarity index above a given threshold.

17. The method of claim 16, wherein the method further comprises assigning semantic annotations to the data values in each data value set.

18. A non-transitory computer-readable storage medium containing a computer-readable code that when read by a computer causes the computer to perform a method for automatically linking data elements in data sources, the method comprising:

identifying a plurality of data elements, each data element derived from a given data source and comprising a subset of data from the given data source, the subset of data comprising an unifying context within the given data source, each data source comprising a database accessible by a computing system and containing data in machine readable format;

obtaining a data value set comprising a plurality of data values for the subset of data in each data element;

determining a dimensionally reduced instance signature for each data element based on all data values associated with that data element to yield a plurality of dimensionally reduced instance signatures each comprising an equivalent fixed number of hash values, by:
identifying a plurality of data value hash functions equal to the fixed number of hash values; and
using the plurality of data value hash functions to generate the dimensionally reduced instance signature for each data element by processing all data values in each data value set through each one of the plurality of data value hash functions to generate one of the hash values such that similarities among the data values in the data value sets across all data elements is maintained among the plurality of instance signatures such that each hash value comprises input from all data values in each data element;

using the plurality of instance signatures to identify candidate pairs of data elements to link by using a signature hash function separate from the plurality of data value hash functions to map each dimensionally reduced data signature into one category in a plurality of categories and only identifying candidate pairs of data elements to link having dimensionally reduced data signatures mapped to a common category;

generating a similarity index for each candidate pair using dimensionally reduced instance signatures for each candidate pair and a pre-determined measure of similarity; and linking candidate pairs of data elements having a similarity index above a given threshold.

19. The non-transitory computer-readable medium of claim 18, wherein the step of using the plurality of data value hash functions further comprises:
processing each data value in a given data value set through each data value hash function to generate for that data value set a plurality of potential hash values for each data value hash function;
selecting a signature hash value for each data value hash function from its plurality of potential hash values; and
assembling the selected hash values into a set of signature hash values, the set of signature hash values comprising the instance signature for that data value set.

20. The non-transitory computer-readable medium of claim 18, wherein the step of determining a dimensionally reduced signature for each data element further comprises:
using semantic annotations associated with data values in each data set to construct a semantic signature for each data set to yield a plurality of semantic signatures; and
the step of using the plurality of instance signatures to identify candidate pairs of data elements to link further comprises using the plurality of instance signatures in combination with the plurality of semantic signatures to identify the candidate pairs.

21. A non-transitory computer-readable storage medium containing a computer-readable code that when read by a computer causes the computer to perform a method for automatically linking data elements in data sources, the method comprising:
identifying a plurality of data elements, each data element derived from a given data source and comprising a subset of data from the given data source, the subset of data comprising an unifying context within the given data source, each data source comprising a database accessible by a computing system and containing data in machine readable format;
obtaining a data value set comprising a plurality of data values for each data element;
using semantic annotations associated with data values in each data set to construct a semantic signature for each data set to yield a plurality of semantic signatures, each semantic signature preserving all semantic similarity in a given data set;
using the plurality of semantic signatures to identify candidate pairs of data elements to link by using a signature hash function separately to map each semantic signature into one category in a plurality of categories and only identifying candidate pairs of data elements to link having semantic signatures mapped to a common category;
generating a similarity index for each candidate pair using semantic signatures for each candidate pair and a pre-determined measure of similarity; and
linking candidate pairs of data elements having a similarity index above a given threshold.

* * * * *